United States Patent [19]
Salzano

[11] Patent Number: 5,514,862
[45] Date of Patent: May 7, 1996

[54] PORTABLE DATA CARRIER

[75] Inventor: Doreen L. Salzano, Parsippany, N.J.

[73] Assignee: AT&T Corp., Murray Hill, N.J.

[21] Appl. No.: 246,586

[22] Filed: May 20, 1994

[51] Int. Cl.⁶ .................... G06K 19/00; G06K 19/06; B42D 15/04
[52] U.S. Cl. .................. 235/487; 235/492; 283/98; 283/107; 283/108
[58] Field of Search ................... 235/487, 492, 235/493; 283/98, 100, 107, 108, 904

[56] References Cited

U.S. PATENT DOCUMENTS

| 4,605,844 | 8/1986 | Haggan. | |
|---|---|---|---|
| 4,692,604 | 9/1987 | Billings. | |
| 4,722,376 | 2/1988 | Rhyner | 283/107 X |
| 4,896,027 | 1/1990 | Drexler | 235/487 |
| 5,326,964 | 7/1994 | Risser | 235/487 |
| 5,362,955 | 11/1994 | Haghiri-Tehrani | 235/492 |
| 5,427,416 | 6/1995 | Birch | 283/108 |

FOREIGN PATENT DOCUMENTS

| 0495216 | 1/1992 | European Pat. Off. | 235/492 |
|---|---|---|---|
| 0521778 | 1/1993 | European Pat. Off. | 235/492 |
| 0535436 | 4/1993 | European Pat. Off. | 235/492 |
| 0617382 | 9/1994 | European Pat. Off. | 235/487 |
| 2622323 | 4/1989 | France | 235/487 |
| 4311379 | 10/1994 | Germany | 235/492 |
| 0306293 | 12/1989 | Japan | 283/98 |

Primary Examiner—Donald T. Hajec
Assistant Examiner—Jeffrey R. Filipek
Attorney, Agent, or Firm—David N. Fogg; Ruloff F. Kip, Jr.

[57] ABSTRACT

A portable data carder assemblage includes smaller and larger plastic cards carrying respective embedded semiconductor chips for transferring data from the miniature card and standard-size card to, respectively, a small personal communicator cellular telephone set and a larger cellular set, the two cards being held in that assemblage by a pliant plastic sheath and a pocket on the sheath into which, respectively, the larger and smaller cards are inserted for safekeeping between uses of the cards. The assemblage may be conveniently transported by being lodged in a card-holding recess in the wallet of the owner of the assemblage. When that owner has only a personal communicator set, the standard-size chip carrying card is replaceable in the assemblage by a standard-size chipless card having therein an aperture into which the small card may be displaced by deformation of the sheath so that the assemblage takes up less room in the wallet.

7 Claims, 3 Drawing Sheets

1

PORTABLE DATA CARRIER

FIELD OF THE INVENTION

This invention relates to portable data carriers in the form of credit cards (or other transaction cards) by which are carried data conveying means for transferring data between the card and apparatus external thereto. More particularly, this invention relates to cards of the kind just described which are miniaturized in size to the point where there is difficulty in keeping track of the location of the card.

BACKGROUND OF THE INVENTION

Most present day cellular communication networks are analogous to wired telephone networks in the sense that, in each network, each of the telephone subscriber stations in the network is identified by a telephone number unique to that station. In the course of a customer placing a call from that station, the identification number of the station (which is a cellular phone in the case of cellular communications) is automatically signaled to a central office to enable the party in whose name the station is listed to be billed for the call.

An alternative mode of billing for the call is usable when the customer has a personal charge account with the telephone company separate from the account for the station. That alternative mode is for the customer, when making the call, to identify (by voice or telephone key pad input), to a telephone operator or computer in the network, the number assigned to and identifying that customer's personal charge account, whereupon the cost of the call is billed to that account.

A problem encountered in recent years is that both such methods for identifying to what account a call should be billed are insecure when customers are placing calls from cellular telephone sets. That is, as such calls are being placed, unscrupulous persons have been able to learn the identification number of the particular cellular telephone set being used. Moreover, if the customer is charging the cost of the call to that customer's personal account, such persons have been able to learn the identification number of that personal account. Those unscrupulous persons have then sold those identification numbers to others who have used them to make large numbers of telephone calls, the costs of which are billed by the telephone company to the innocent customer. Such telephone fraud has been the source of yearly losses to the telephone companies and their customers on the order of millions of dollars.

To prevent such fraud from being practiced, changes have already been made in Europe (and are expected to be made soon in the United States). Those changes are (a) abandoning the practice of the assigning to cellular telephone sets of unique set identifying numbers for use for billing purposes, (b) using instead for such purposes only the identification number of the personal account of the customer placing the call, and (c) communicating that number to the base station from the cellular phone set by having the customer insert into a slot in the set a card carrying data representing the personal account number of the customer, and then having such data read out by the set to permit it to communicate that number in enciphered form to the base station. Cards of the sort just described are sometimes referred to herein as "portable data carriers" or "dam carrying (or carrier) cards". The following of the practices just outlined precludes unauthorized persons from learning the personal account number of the customer placing the call.

While the changes just described constitute a significant advance in the art of making cellular telecommunications more secure, their implementation creates in instances a mechanical difficulty of the following character. Most cellular telephone sets are apparatus large enough to have formed therein a slot for accommodating a data carrying card of standard size in the sense that it is of the same size as that used for conventional credit cards, automobile licenses, and the like. There are, however, some cellular telephone sets which are known as "personal communicators", and which are apparatus so small that they cannot have formed a full size slot and can, accordingly, accommodate only a miniaturized data carrying card, oftentimes vernacularly referred to as a "thumbnail" card. Such "thumbnail" cards are themselves, however, so small in size as to have, say, a width of only about five-eighth inch (⅝") and a length of only about one inch (1"). Because of that small size, it is very easy for such thumbnail cards to become misplaced and difficult to find when carded on the person of the owner of the card. As a result, some cellular telephone customers with personal communicator sets retain their thumbnail cards inserted at all times in the set. That practice, however, compromises the capability of keeping the customer's personal account secure since, if the customer is not watching the set, an opportunity is afforded for the card to be covertly possessed by another long enough to learn from the data carried by the card the personal account number therefor. Thus, the thumbnail cards which must be used with personal communicator sets have the disadvantage that, if separated from the set, they are easily misplaced, but, if not separated from the set, the customer's personal account number may be covertly learned.

SUMMARY OF THE INVENTION

The foregoing and other disadvantages arising out of the need to use miniaturized data carrying cards with personal communicator cellular telephone sets are obviated by providing portable data carrier assemblages of the character set out by the appended claims.

BRIEF DESCRIPTION OF THE DRAWINGS

For a better understanding of the invention, reference is made to the following description of an exemplary embodiment thereof, and to the accompanying drawings wherein.

DETAILED DESCRIPTION OF THE EMBODIMENT

Figure 1:
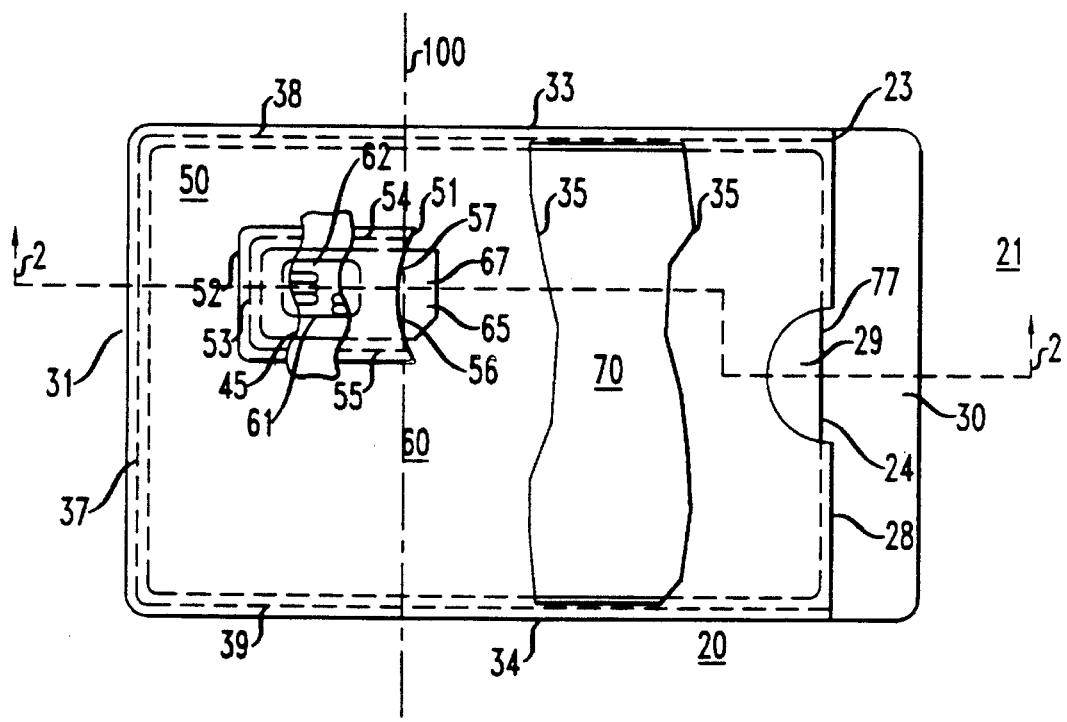
FIG. 1 is a plan view of an exemplary portable data carrier assemblage, according to the invention, when such assemblage is in assembled firm, parts of such assemblage being depicted as broken away in order to better show certain details of that assemblage.

Referring now to FIG. 1, the reference numeral 20 designates a portable data carrier assemblage comprising a laminar dimensionally stable support unit 21 and a laminar dimensionally stable plastic miniature card 60 associated with unit 21.

The support unit 21 comprises the separate components therefor of a flat pliable plastic sheath 23 and an additional laminar dimensionally stable plastic card 70 shown in FIG. 1 as fully inserted into sheath 23.

Figure 2:
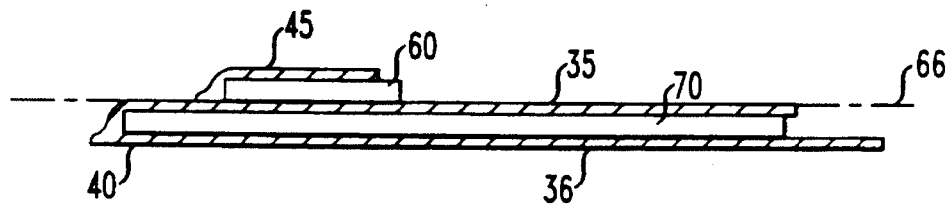
FIG. 2 is a front elevation in vertical cross-section, taken as indicated by the arrows 2—2 in FIG. 1, of the FIG. 1 assemblage.

The external configuration of support unit 21 is essentially that of its outside component, the sheath 23. That element has an open front end 30, a back end 31 longitudinally spaced from front end 30, and laterally spaced margins 33, 34 longitudinally extending between ends 30 and 31. The sheath comprises upper and lower synthetic resinous rectangular pliable plastic panels 35 and 36 (FIG. 2) disposed, respectively, on first and second transversely opposite sides of the sheath and in transverse registration with each other. Panels 35 and 36 may each conveniently (but not necessarily) be constituted of polyethylene film material.

The upper panel 35 on the first side of the sheath is thermally bonded to the lower panel 36 on the sheath's second side along seam 37 at the panel's back end 31 and along seams 38 and 39 extending from that end at the margins 33, 34 of the sheath to its open front end 30. As shown in FIG. 1, the lower panel 36 at the sheath's front end 30 projects longitudinally outward slightly beyond upper panel 35, and that upper panel has formed in its border 28 at front end 30 a laterally-central crescent-shaped concavity 29 exposing a region 17 the sheath below and within that concavity to finger tip contact.

Figure 3:
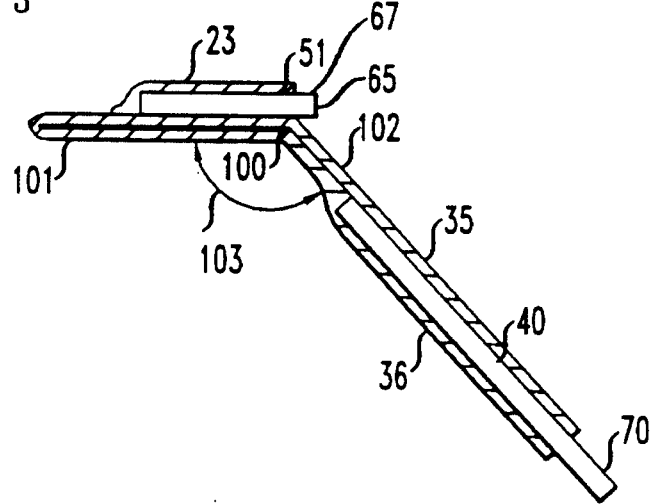
FIG. 3 is a front elevation of the FIG. 1 assemblage when, in the course of its use, it is angularly flexed, the right hand end of the assemblage being shown partly broken away to show details thereof.

The sheath 23 has therein a passage 40 disposed between the upper and lower sheath panels 35 and 36 by virtue of those panels being bonded together as described. Passage 40 is fully enclosed by the sheath except at its open front end 30. When nothing is contained within that passage and panels 35 and 36 make contact with each other, the passage 40 amounts to only a discontinuity between those panels. The passage 40 can, however, be transversely expanded from that discontinuity to include vacant space (as shown in FIG. 3) and to accommodate the plastic card 24 later described in more detail.

The assemblage 20 includes holder means for retaining the miniature card 60 in attached relation with the support unit 21 to be supported thereby and transportable therewith. In FIG. 1, such holder means takes the form of plastic closure means constituting a rectangular patch 45 of polyethylene film material joined to the upper sheath panel 35 on the outside of that panel to provide on the first or upper side of sheath 23 a pocket 50 having an opening 51 therefor and a bottom 52 spaced from that opening. Such pocket is conveniently (but not necessarily) oriented so that its bottom 52 is spaced from the pocket opening in the longitudinal direction away from the front end of the sheath, and so that the pocket 50 as a whole lies farther from that end than it does from the sheath's back end 31. The mode of joining the patch 45 to the upper sheath panel 35 to provide the pocket 50 is that the patch is thermally bonded to that panel along a seam 53 at the bottom 51 of the pocket and along seams 54 and 55 extending at the laterally spaced margins of that panel from bottom 52 to the pocket opening 51. The border 56 of patch 45 at that opening has a laterally-central crescent-shaped concavity 57 formed in that border to expose a region of the pocket below and within that concavity to finger tip contact.

Figure 4:
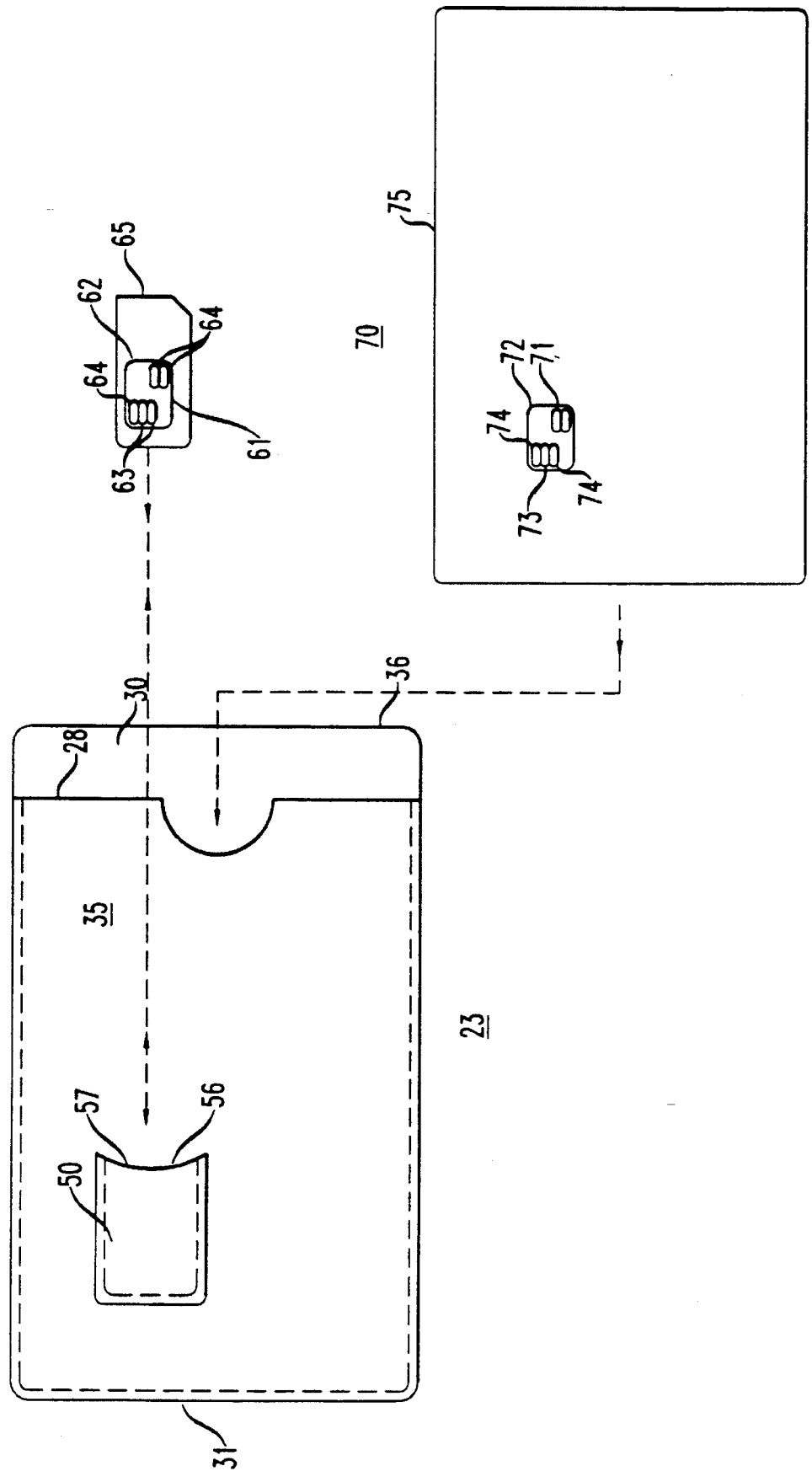
FIG. 4 is an exploded plan view of the FIG. 1 assemblage, showing it in unassembled form and as comprising the mutually separable components of a plastic sheath, a miniaturized data carrier card and a standard-size data carrier card.

The pocket 50 serves as a receptacle for a laminar dimensionally stable plastic miniature or "thumbnail" card 60 (FIGS. 1 and 3) having longitudinal and lateral extents which, as exemplary values, may be about one inch (1") and five-eighth inch (⅝"), respectively, and each of which is smaller than the lateral extent of support 21. The card 60 comprises a plastic panel 65 which may have a three-ply laminar structure (not shown) consisting of top and bottom relatively hard and thin outside plastic layers each bonded to a relatively thicker and softer inner or central "matrix" plastic layer. The card 60, however, also comprises and is a carrier of data conveying means in the form of a semiconductor chip 61 providing a semiconductor memory and circuit means for writing data into and reading data out from that memory. The chip 61 is embedded in the card 60 so that the lower surface of the chip is underlying by the plastic of the card but the upper surface 62 of the chip is exposed on the upper side of the card. That upper surface 62 has thereon a gold coating divided by gaps 63 (FIG. 4) in the coating into a plurality of contact pads 64. The data conveying means provided by chip 61 is, therefore, of the electromechanical contact type referred to in U.S. Pat. No. 4,605,844 issued Aug. 12, 1986 in the name of D. E. Haggan for "Computerized Transaction Card With Conductive Data Transfer" and assigned to the assignee hereof and incorporated herein by reference and made a part hereof ("Haggan"). That is, in the case of card 60, transfer of data between the chip 61 and apparatus external thereto is effected by mechanically engaging pins of that apparatus with the contact pads 64 of the chip, and by then producing flow through such pins and pads of electrical signals representing data. When it is first known who will be the owner of card 60, the card is preliminarily readied for use by that customer by writing into the memory of chip 61 the data which represents the personal account number of that customer and such other information as may be needed to bill the customer for making telephone calls. Once, however, that preliminary data has been written into the memory of chip 61, such memory becomes a read only memory ("ROM") and the chip from then on is used only to transfer data from card 60 to external apparatus.

Because of the requirements that card 60 must carry the chip 61 embedded therein as described and must surround that chip (except at its exposed top surface 62) by a matrix protecting the chip from damage, the card has a transverse thickness greater than that of sheath 23 as measured through its panels 35 and 36 when in mutual contact, and the card is relatively stiff, i.e., capable in ordinary use of being resiliently flexed.

When the described portable carrier assemblage 20 is in assembled form (FIG. 1), the miniature or thumbnail card 60 is inserted through the front opening 51 of pocket 50 as far the card can be longitudinally moved into the pocket. When card 60 is so fully inserted into pocket 50, the card is seated with a snug fit in such pocket to thereby be attached to sheath 23. At that time, the pocket 50 is operable to retain card 60 and its support unit 21 relatively positioned so that the area of card 60 is fully contained within the outline of the area of the support unit when both of said areas are projected transversely onto a common longitudinal-lateral plane as, say, the plane 66 shown in FIG. 2. Further, when assemblage 20 is fully assembled and the card 60 is fully inserted in the pocket 50 as described, the pocket is operable to retain the card 60 in aligned juxtaposed relation with its support unit 21 and, more particularly, with sheath 23.

As stated, FIG. 1 shows the miniature card 60 when it has been inserted through the front opening 51 of pocket 50 as far as the card can be longitudinally moved into that pocket. When, however, the card is in that fully seated position, in pocket 50, there is an exposed portion 67 of card 60 which projects from the pocket opening 51 longitudinally outward towards the front end 30 of sheath 23.

A third component of the portable data carrier assemblage is an additional laminar dimensionally stable plastic card 70 (FIGS. 1 and 3) having longitudinal and lateral extents each greater than either of such extents of the miniature card 60. Those longitudinal and lateral extents of card 70 may have exemplary values of about 2 ⅛ " and 4 3/16 ", respectively and, in relation to miniature card 60, the additional card 70 is standard-size. That is, card 70 is of about the same size as conventional credit cards, automobile license slips, and similar cards stored in a wallet.

Like the miniature card 60, the standard-size card 70 has embedded therein data conveying means in the form of a semiconductor chip 71. The chip 71 and other elements 72–75 of card 70 correspond to respectively the elements 61 and 62–65 of card and, taking into account the difference in size between the two cards, the description previously given of elements 61–65 of card 60 applies routaris mutandis to the corresponding elements 71–75 of card 70 except as may be otherwise noted herein. Like chip 60, the standard size card 70 has a transverse thickness greater than the combined thickness of the panels 35 and 36 of sheath 23 when in mutual contact. When card 70 is fully inserted into sheath 23, the chip 71 on that card is directly below (FIG. 1) the corresponding chip 61 on card 60 and, thus, is not seen in FIG. 1.

As a difference between the two cards, while the card 60 when fully seated in pocket 50 has a portion 67 which projects outward of the pocket opening 51 over its entire lateral extent so as to be an exposed portion at any point in that extent, when the card 70 is fully seated in the passage 40 in sheath 23, the exposed portion of card 0 consists of only a small portion 77 thereof laying within and beneath the concavity 29 formed in the border of panel 35 at the open front end 30 of sheath 23.

The standard size card 70 is removably insertable through the open front end 30 of sheath 23 into its interior passage 40 to have a snug fit therein with the sheath. When the card is inserted through that front end 30 so far that it cannot be longitudinally moved further into the passage 40, the card is fully seated in the sheath (FIG. 1) and provides a stiffening member for the support unit 21 consisting of such card and sheath to render dimensionally stable that support unit as a whole.

Figure 8:
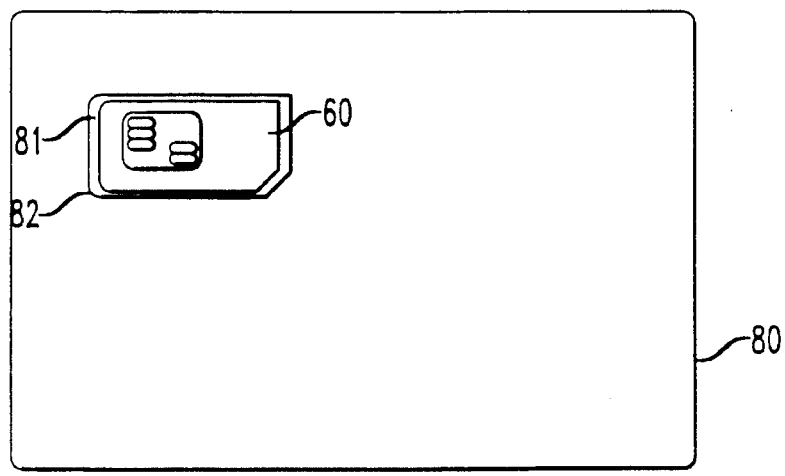
FIG. 8 is a plan view of a standard size card which does not carry data, and which may replace in the FIG. 1 assemblage the data carrier card shown in FIG. 4.

FIG. 8 is a plan view showing the miniature card 60 in superposed relation with the filler card 80 when the two cards occupy the same relative positions as they would if card 60 were to be fully seated in pocket 50 as earlier described, and if card 80 were to be fully seated in sheath 23 by being inserted in front end 30 of sheath 30 into its passage 40 so far that the card cannot be longitudinally inserted further into the passage. As shown in FIG. 8, the card 80 has formed therein an aperture 81 which is disposed in the longitudinal and lateral extents of card 80 to register transversely with card 60 when both cards 60 and 80 are in fully seated position in assemblage 20. As further shown, that aperture 81 has a perimeter 82 of such size and shape that, when the two cards 60 and 80 are so fully seated in assemblage 20, the aperture perimeter 82 is spaced outwardly of the miniature card 60 everywhere around that card so that the miniature card is transversely displaceable at least partly into the aperture 81. Such displacement is accomplished by pliant deformation of the portion of the sheath panel 35 which extends over aperture 81 and around it outwards of its perimeter for a limited distance.

Since card 80 has no semiconductor chip embedded therein, the card has no lower limit placed on its thickness by the need to accommodate such a chip within that thickness. Further, card 80 need not have the stiffness needed to protect such an embedded chip from damage. Accordingly, card 80 may be thinner than card 70 and, also, may be laterally resiliently flexed to a degree while remaining stiff enough so that the lateral extent of the card will not be much reduced in the presence of the largest bending stress normally exerted on the card in the course of its use.

USE OF THE EMBODIMENT

For the purpose of describing how the portable data carrier assemblage 20 is used, it will be assumed that, at the time first considered, the owner of the assemblage has removed miniature card 60 from assemblage 20 (which is otherwise in assembled form as shown in FIG. 1 ), and then used that card to place a telephone call, and it is now desirable to store that card for future use in some manner whereby the card will not become misplaced or otherwise difficult to find.

Figure 5:
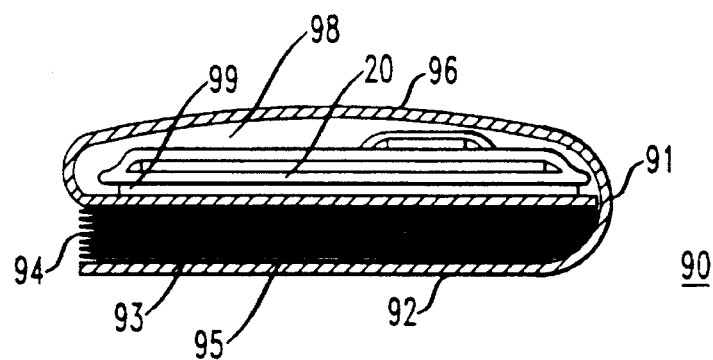
FIG. 5 is a view in cross-section of a wallet aid and of the FIG. 1 assemblage received in a card holding recess in such wallet, the view in FIG. 5 of such assemblage being a right side elevation in relation to the showing of that assemblage in FIG. 1.

To that end, such owner replaces card 60 in assemblage 20 by inserting the card into the pocket 50 therefor in sheath 23 until the card is fully seated in that pocket. The now fully assembled article 20 is then stowed for safekeeping in the owners wallet 90 depicted in cross section in FIG. 5.

Wallet 90 comprises a synthetic leather "backbone" 91 which couples together the wallet's other elements, two synthetic leather partitions 92, 93 which run the length of the wallet and define between them a main compartment 94 for holding currency bills 95, and an outside pliable synthetic leather closure shroud 96 extending from the back end of the wallet in a direction normal to the plane of the drawing about half way to the wallet's center (at which the cross-section for FIG. 8 is taken). The elements 91 and 96 define between them a card-holding recess or compartment 98 which is open at its end viewed in FIG. 5.

The portable data assemblage 20 is inserted by its owner for safekeeping into the card-holding recess 98 of the owner's wallet to there remain, along with other cards 99, until there is again a need to employ a data carrying card in the assemblage to place a telephone call. When miniature card 60 is seated in assemblage 20 which is then placed in the wallet 90 of a telephone customer, the location of card 60 is ordinarily well known at all times to such customer. Hence that miniature card 60 when so stowed between uses thereof will not likely be lost or misplaced or otherwise difficult to find as it might well be if card 60 were just kept loose in a pocket or the like. Also, since the card 60, when in assemblage 20 in turn in wallet 90, is at all times either on the person of, or likely to be under the close surveillance of, the card's owner, it is unlikely that the card will be stolen. Since the card is held with a snug fit in assemblage 20 which in turn has a snug fit in wallet recess 98 when inserted thereinto (and because of the stiffness imparted to the support unit by card 70 or 80, whichever is used), the card 60 cannot undergo random angular turning within wallet recess 98 and this become lost or jammed therein as such card likely would do if card 60 were to be introduced, apart from assemblage 20, into recess 98 to be mixed therein with the other cards 99.

When the next occasion arises to use card 60 to place a telephone call, the portable data carrier assemblage 20 is removed from wallet 90. Then, and, in order to more easily detach the miniature card 60 from its support unit 21, the standard size card 70 or 80 in sheath 23 is fully or partly retracted (FIG. 3) from the sheath 23 to remove the stiffening effect of that card. The pliable sheath is then flexed to have the sheath define a dihedral angle of which the edge corresponds to a bend line 100 in the sheath (FIG. 1), extending laterally across the sheath at the pocket opening 51, and of which the two faces of that angle correspond to left and right hand flat portions 101 and 102 of said sheath (FIG. 3) on longitudinally opposite sides of the bend line 100. The dihedral angle thus formed has, on the lower or second side of sheath 23, a plane angle 103 which is an obtuse angle.

The effect of flexing sheath 23 to define thereby the described dihedral angle is to produce between the right hand flat portion 102 of sheath 23 (FIG. 3) and the outwardly projecting portion 67 of card 60 an angular divergence causing the distance between portions 102 and 67 to progressively increase with increasing distance on those portions from the pocket opening 51. Because of that divergence, a space is opened up under card portion 67 permitting the lower side of the portion to be contacted by the nail of the index finger while, concurrently, the portion's upper side is contacted by the nail of the thumb. It is thus much easier to manually grip card portion 67 and remove card 60 from pocket 50 than if such divergence was not present.

Figure 6:
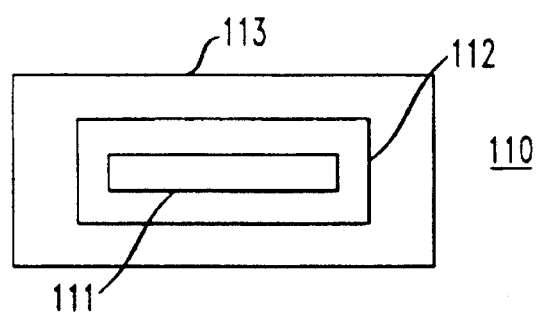
FIG. 6 is a schematic plan view of first apparatus constituting a small personal communicator cellular telephone set.

After the card 60 has been pulled out of the owner's pocket, the card is used to place a telephone call with first apparatus in the form of a personal communicator cellular telephone set 110 (FIG. 6). Set 110 comprises a receptacle space for card 60 in the form of a slot 111, a reader section 112 (for reading out from card 60 when in slot 111 the identification which, as earlier described has been preliminarily written into the card before its issuance to its owner), and a transmit/receiver section 113 for effecting two-way telephone communication between set 110 and a base station (not shown). The full insertion of card 60 into slot 111 initiates the placing and conducting of a telephone call with the base station. At the end of the call, card 60 is removed from slot 60 and returned to assemblage 20 which is then put back in the owners wallet.

The set 110 is so small that its card receiving slot 111 and the card 60 insertable in that slot must be greatly reduced in their dimensions, as described, in order to be compatible in size with set 110. As a result, the slot 111 cannot accommodate therein standard size data carrier card 70.

Figure 7:
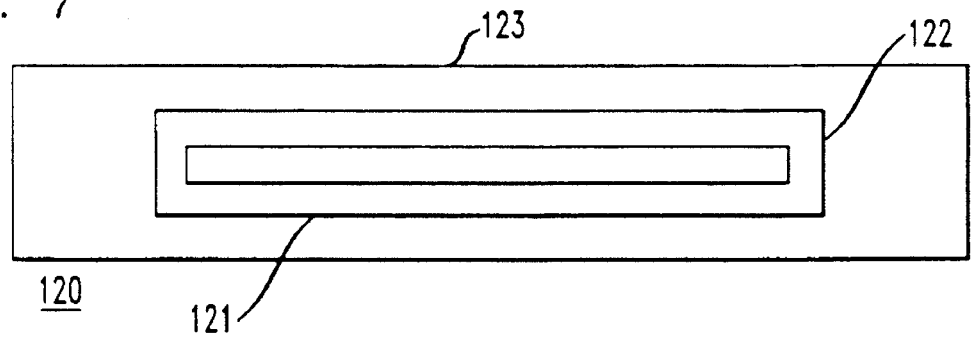
FIG. 7 is a schematic plan view of second apparatus constituting a conventional size cellular telephone set.

Instead of placing and conducting a telephone call by personal communicator set 110, the owner of data carrier assemblage 20 may wish to place and conduct a telephone call via a conventional cellular telephone set 120 (FIG. 7) substantially larger than set 110. That larger set 120 has elements 121–123 respectively corresponding to the elements 111–113 of set 110, and the description herein of elements 111–113 of set 110 (and of the use of that set) applies mutatis mutandis to the elements 121–123 of set 120 (and the use of that set) except as may be otherwise noted therein. The slot 121 of set 120 is of course large enough to accommodate card 70 which, when fully inserted in that slot, initiates a call to the base station. At the end of the call placed and conducted via conventional set 120, the card 70 is retracted from slot 121 and returned to assemblage 20 which is then put back in the owner's wallet 90 and kept there until the next time a cellular call is to be made.

If the owner of assemblage 20 does not ever wish to use a standard size cellular telephone set such as set 120 (or does not have one) the data carrying card 70 in assemblage 20 may be permanently replaced by the filler card 80. Advantages in using the filler card 80 instead of card 70 are that card 80 may be made more resiliently flexible to conform itself better to the cross-sectional shape of the card holding recess 98 in wallet 90, the card 80 may also be made thinner than card 70 to cause assemblage 20 to take up slightly less room in that recess, and the aperture 81 in filler card 80 permits the miniature card 60 to be transversely displaced at least partly into that aperture by deformation of sheath 23 under forces exerted on assemblage 20 when squeezed into recess 20. Such transverse displacement of card 60 into aperture 81 enables the assemblage to occupy less space in the transverse dimension when in recess 98 to thereby fit better into that recess than the assemblage would if it contained card 70.

The above described embodiment being exemplary only, it is to be understood that additions thereto, omissions therefrom and modifications thereof may be made without departing from the spirit of the invention. For example, without restriction, if the chip 71 on standard-size card 70 is shifted from its present shown location thereon (FIG. 4) to one in which the chip does not underlie the chip 61 on card 60 when both cards are fully seated in assemblage 20 then the card 70 may be provided with an aperture 81 like that of filler card 80 to thereby secure for the data carrying card 70 the advantages described herein, in connection with card 80, of having such an aperture.

As another example, without restriction, while the data conveying means disclosed herein as carried by miniature and standard size cards 70 and 80 have been described as being semiconductor chips 71 and 81 which are mechanically contactable by pins of external apparatus to effect data transfer between the chip and apparatus, either one or both of the miniature and standard-size cards may, instead, be "smart cards" of the kind disclosed in the aforementioned Haggan patent or in U.S. Pat. No. 4,692,604 issued Sep. 8, 1987 to Robert Billings for "Flexible Inductor", and assigned to the assignee hereof, and which cards carry data conveying means for bidirectional transfer of data, during use of the cards by their owners, between such means and external apparatus without mechanical contact being used to effect that transfer. A still another example, without restriction, the described sheath may have thereon a plurality of pockets for holding in them a plurality of cards less in size than the card in the sheath.

Accordingly, the invention is not to be considered as limited save as is consonant with the recitals of the following claims.

I claim:

1. A portable data carrier assemblage comprising;
    a laminar support unit comprising a flat pliable plastic sheath having first and second transversely opposite sides and having longitudinal and lateral extents which are relatively larger and smaller, respectively, said sheath having an open front end and a back end and a passage therein longitudinally extending between said ends, a laminar plastic miniature card having longitudinal and lateral extents each smaller than said lateral extent of said unit, said sheath having a transverse thickness when empty which is less than that of said miniature card, data conveying means carried by said miniature card for transferring data between said miniature card and first apparatus external thereto when said miniature card is placed in a receptacle space in said apparatus large enough to receive said miniature card but too small to receive said unit, holder means for retaining said miniature card attached with said unit to be supported thereby and transportable therewith, the assemblage of said unit, miniature card and holder means being longitudinally insertable with a snug fit into a card holding recess in a wallet, said miniature card being selectably detachable from said unit to permit said miniature card to be inserted in said receptacle space and reattached by said holder means with said unit, an additional laminar plastic card having longitudinal and lateral extents each greater than either of such extents of such miniature card so as to be a standard-size card, said standard-size card being removably insertable through said open front end of said sheath into said passage to have a snug fit therein with said sheath, said standard-size card when fully seated in said passage providing a stiffening member for said support unit to render dimensionally stable said unit as a whole, said standard-size card having formed therein an aperture extending transversely through such card and disposed in the longitudinal and lateral extents thereof to transversely register with said miniature card when both of said cards are in fully seated position in said assemblage, and when said cards are so inserted, the perimeter of said aperture is spaced outwardly of said miniature card everywhere around said miniature card so that said miniature card is transversely displaceable at least partly into said aperture by pliant deformation of said sheath.

2. An assemblage according to claim 1 in which said unit and card are each planar, and said holder means is operable to retain said card in aligned juxtaposed relation with said unit.

3. An assemblage according to claim 2 in which said holder means is operable to retain said unit and card relatively positioned so that the area of said card is fully contained within the outline of the area of said unit when both said areas are transversely projected onto the same longitudinal-lateral plane.

4. An assemblage according to claim 1 in which said holder means for said miniature card comprises plastic closure means joined to said sheath on said first side thereof and forming on that side a pocket having an opening therefor and a bottom spaced from said opening, and in which said miniature card is insertable through said opening into said pocket to be seated therein with a snug fit and thereby be attached to said sheath.

5. An assemblage according to claim 4 in which said pocket is disposed on said first side of said sheath to have said opening of said pocket longitudinally spaced both from said pocket bottom and from said front end of said sheath, and in which said miniature card when fully seated in said pocket has an exposed portion which projects outward from said pocket opening, and which is graspable by hand to facilitate manual removal of such card from said pocket.

6. An assemblage according to claim 5 in which said sheath is responsive to flexing thereof to form a dihedral angle having a plane angle which is an obtuse angle on said second side of said sheath, an edge corresponding to a bend line in the sheath extending laterally across said sheath at said opening for said pocket, and two faces corresponding to the portions of said sheath on longitudinally opposite sides of said bend line, and in which, when said sheath is flexed to form said dihedral angle, said exposed portion of said miniature card progressively diverges from said sheath, with increasing distance of such exposed portion from such opening in the direction toward the first end of said sheath, so as to facilitate by such divergence the grasping by hand of said miniature card.

7. An assemblage according to claim 1 in which said standard-size card carries data conveying means for transferring data between such card and second apparatus external to such card when placed in a receptacle space provided in said second apparatus and large enough to accommodate said standard-size card.

* * * * *